US010064223B2

(12) United States Patent
Kang et al.

(10) Patent No.: US 10,064,223 B2
(45) Date of Patent: Aug. 28, 2018

(54) APPARATUS AND METHOD FOR SELECTING D2D COMMUNICATION MODE DEPENDING ON SIGNAL INTERFERENCE

(71) Applicants: Samsung Electronics Co., Ltd, Gyeonggi-do (KR); Sungkyunkwan University Foundation Corporate Collaboration, Gyeonggi-do (KR)

(72) Inventors: Jin Whan Kang, Gyeonggi-do (KR); Sang-Hyo Kim, Seoul (KR); Jong-Hwan Kim, Gyeonggi-do (KR); Chung-Ki Cho, Gyeonggi-do (KR)

(73) Assignees: SAMSUNG ELECTRONICS CO., LTD., Suwon-si (KR); SUNGKYUNKWAN UNIVERSITY FOUNDATION FOR CORPORATE COLLABORATION, Suwon-si (KR)

( * ) Notice: Subject to any disclaimer, the term of this patent is extended or adjusted under 35 U.S.C. 154(b) by 589 days.

(21) Appl. No.: 13/930,984

(22) Filed: Jun. 28, 2013

(65) Prior Publication Data

US 2014/0018121 A1    Jan. 16, 2014

(30) Foreign Application Priority Data

Jun. 29, 2012  (KR) .................. 10-2012-0070449

(51) Int. Cl.
*H04W 76/02* (2009.01)
*H04B 7/06* (2006.01)
*H04W 76/14* (2018.01)

(52) U.S. Cl.
CPC ........ *H04W 76/023* (2013.01); *H04B 7/0689* (2013.01); *H04W 76/14* (2018.02)

(58) Field of Classification Search
CPC ... H04W 76/023; H04W 4/08; H04W 72/082; H04W 72/10; H04W 8/005; H04B 7/0617; H04B 7/0413
See application file for complete search history.

(56) References Cited

U.S. PATENT DOCUMENTS 8,072,917 B2    12/2011  Wu et al.
2003/0045288 A1*  3/2003  Luschi ............... H04W 52/16
                                                            455/434

(Continued)

FOREIGN PATENT DOCUMENTS

EP        2385643 A1 * 11/2011 ........... H04L 1/0003

OTHER PUBLICATIONS

Wu, Xinzhou, et al., "FlashLinQ: A Synchronous Distributed Scheduler for Peer-to-Peer Ad Hoc Networks," IEEE/ACM Transactions on Networking, vol. 21, Issue 4, Aug. 2013 and 2010 48th Annual Allerton Conference on Communication, Control and Computing (Allerton), Sep. 29-Oct. 1, 2010, 14 pages.

*Primary Examiner* — Dong-Chang Shiue

(57) ABSTRACT

An apparatus and method select a Device (D2D) communication mode according to whether there is signal interference. A method of operating a Transmitting (Tx) terminal, linked to a Receiving (Rx) terminal, for performing D2D communication includes confirming that the terminal is included in at least any one of groups in which links are grouped according to a link priority, receiving a result of determining whether there is a signal interference caused by at least three in-group links from the Rx terminal, and selecting a communication mode for communicating with the Rx terminal according to whether the signal interference exists.

17 Claims, 9 Drawing Sheets

(56) References Cited

U.S. PATENT DOCUMENTS

| | | | |
|---|---|---|---|
| 2007/0223423 A1* | 9/2007 | Kim | H04B 7/0417 |
| | | | 370/334 |
| 2007/0243839 A1* | 10/2007 | Kostic | H04B 7/0413 |
| | | | 455/132 |
| 2008/0248773 A1* | 10/2008 | De Carvalho | H04B 7/0854 |
| | | | 455/278.1 |
| 2009/0016231 A1 | 1/2009 | Li et al. | |
| 2011/0059765 A1* | 3/2011 | Kim | H04B 7/024 |
| | | | 455/550.1 |
| 2011/0292817 A1* | 12/2011 | Leconte | H04W 74/0816 |
| | | | 370/252 |
| 2012/0058788 A1* | 3/2012 | Papadopoulos | H04B 7/0452 |
| | | | 455/501 |
| 2013/0083699 A1* | 4/2013 | Wu | H04W 76/023 |
| | | | 370/255 |
| 2014/0057670 A1* | 2/2014 | Lim | H04W 8/005 |
| | | | 455/509 |

\* cited by examiner

US 10,064,223 B2

APPARATUS AND METHOD FOR SELECTING D2D COMMUNICATION MODE DEPENDING ON SIGNAL INTERFERENCE

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jun. 29, 2012 and assigned Serial No. 10-2012-0070449, the entire disclosure of which is hereby incorporated by reference.

TECHNICAL FIELD

The present disclosure relates to Device to Device (D2D) communication. Particularly, the present disclosure relates to selecting a D2D communication mode according to signal interference.

BACKGROUND

The D2D communication is a wireless communication technique capable of performing direct communication between neighboring terminals without an aid of an access point or the like, and is expected as a promising next generation mobile communication technique since it can solve a traffic overload problem by distributing traffic concentrated in the access point.

A link scheduling technique is considered as a method of avoiding an inter-link interference caused by several D2D links which produce an interfering channel in D2D communication. However, since the link scheduling technique has been developed for a single-antenna wireless communication device, it is not suitable for a Multi Input Multi Output (MIMO) wireless communication technique used for fast transmission of large-sized multimedia data in a next generation mobile communication system.

Accordingly, there is a need for a link scheduling technique which can also be applied to a multi-antenna wireless communication device and which considers a feature of a MIMO transmission/reception technique that can be applied after link scheduling.

SUMMARY

To address the above-discussed deficiencies of the prior art, it is a primary object to provide an apparatus and method capable of effectively performing link scheduling on a wireless communication device employing multiple antennas.

Another aspect of the present disclosure is to provide an apparatus and method capable of reducing and/or minimizing signal interference between links through link scheduling and of effectively reusing the same resource.

Another aspect of the present disclosure is to provide an apparatus and method capable of effectively performing link scheduling by grouping a plurality of links which perform Device to Device (D2D) communication.

Another aspect of the present disclosure is to provide an apparatus and method capable of selecting various communication modes depending on a presence/absence of a signal interference caused by a neighboring link.

In accordance with an aspect of the present disclosure, a method of operating a Transmitting (Tx) terminal, linked to a Receiving (Rx) terminal, for performing D2D communication is provided. The method includes confirming that the terminal is included in at least any one of groups in which links are grouped according to a link priority, receiving a result of determining whether there is a signal interference caused by at least three in-group links from the Rx terminal, and selecting a communication mode for communicating with the Rx terminal according to whether the signal interference exists.

In addition, the method may further include searching for other terminals for performing the D2D communication, transmitting information including the number of Tx antennas and the number of Rx antennas to each of the found terminals, and receiving information including the number of Tx antennas and the number of Rx antennas from the respective terminals.

In addition, the grouping may be determined by the equation of:

$$\sum_{i=1}^{K} d^{[i]}(M^{[i]} + N^{[i]} - 2d^{[i]}) \geq \sum_{i,j \in K, i \neq j}^{K} d^{[j]} d^{[i]}.$$

where K is the number of links in the group, $M^{[i]}$ is the number of antennas of the i-th Tx terminal in the group, $N^{[i]}$ is the number of antenna of the i-th Rx terminal in the group, and $d^{[i]}$ is the number of data streams transmitted from the i-th Tx terminal.

In addition, the confirming that the terminal is included in at least any one of groups in which links are grouped according to the link priority may include confirming that a transmission request signal to be transmitted to the Rx terminal is mapped to any one of regions of the $1^{st}$ Tx resource block (RB), and confirming the link priority by confirming a location of the region to which the transmission request signal is mapped.

In addition, the any one of the regions of the $1^{st}$ Tx RB may be any one of regions consisting of at least one Orthogonal Frequency Division Multiplexing (OFDM) symbol and at least one frequency tone.

In addition, the link priority may be increased from a lower right region to an upper left region among the regions of the $1^{st}$ Tx RB.

In addition, the method may further include transmitting a transmission request signal to the Rx terminal.

In addition, the method may include receiving a transmission response signal from the Rx terminal by using one of regions of the $1^{st}$ Rx RB, confirming a communication-enabled terminal corresponding to a region in which no signal is transmitted among regions of the $1^{st}$ Rx RB, mapping a signal to one of regions of the $2^{nd}$ Tx RB so as to be matched to the confirmed communication-enabled Tx terminal, and transmitting the signal mapped to one of regions of the $2^{nd}$ Tx RB to the Rx terminal.

In addition, the receiving of the result of determining whether there is the signal interference caused by the at least three in-group links from the Rx terminal may include determining the number of data streams according to whether the signal interference exists.

In addition, the selecting of the communication mode for communicating with the Rx terminal according to whether the signal interference exists may include selecting any one communication mode among a single user Multi Input Multi Output (MIMO) beamforming mode, a Zero Forcing (ZF) beamforming mode, and an Interference Alignment (IA) beamforming mode according to the determined number of data streams depending on the signal interference.

In accordance with another aspect of the present disclosure, a method of operating an Rx terminal, linked to a Tx terminal, for performing D2D communication is provided. The method includes confirming that the terminal is included in at least any one of groups in which links are grouped according to a link priority, performing interference checking on an out-group link, and performing communication according to a communication mode selected by the Tx terminal.

In addition, the grouping may be determined by the equation of:

$$\sum_{i=1}^{K} d^{[i]}(M^{[i]} + N^{[i]} - 2d^{[i]}) \geq \sum_{i,j \in K, i \neq j}^{K} d^{[j]}d^{[i]}.$$

where K is the number of links in the group, $M^{[i]}$ is the number of antennas of the i-th Tx terminal in the group, $N^{[i]}$ is the number of antenna of the i-th Rx terminal in the group, and $d^{[i]}$ is the number of data streams transmitted from the i-th Tx terminal.

In addition, the confirming that the terminal is included in at least any one of groups in which links are grouped according to the link priority may include receiving a transmission request signal from the Tx terminal, confirming that the transmission request signal is received in any one of regions of the $1^{st}$ Tx RB, and confirming the link priority by confirming a location of the region in which the transmission request signal is received.

In addition, the any one of the regions of the $1^{st}$ Tx RB may be any one of regions consisting of at least one OFDM symbol and at least one frequency tone.

In addition, the link priority may be increased from a lower right region to an upper left region among the regions of the $1^{st}$ Tx RBs.

In addition, the performing of the interference checking on the out-group link may include, if it is determined that the group is a highest-priority group, determining whether there is a signal interference caused by at least three Tx terminals in a group having a lower priority, and if it is determined that the signal interference caused by the at least three Tx terminals having the lower priority is present, mapping an indicator signal to one of the regions of the $1^{st}$ Rx RB assigned to a Rx terminal having the signal interference.

In addition, the performing of the interference checking on the out-group link may include, if it is determined that the group is not the highest-priority group, determining whether there is a signal interference caused by at least three Tx terminals in a group having higher priority, and if it is determined that the signal interference caused by the at least three Tx terminals having higher priority is present, mapping an indicator signal to one of regions of the $1^{st}$ Rx RB assigned to the Rx terminal having the signal interference.

In addition, the method may further include, if it is determined that the signal interference caused by the at least three Tx terminals having higher priority is absent, determining whether there is a signal interference caused by at least three Tx terminals having lower priority, and if it is determined that the interference caused by the at least three Tx terminals having lower priority is present, mapping the indicator signal to one of regions of the $1^{st}$ Rx RB so as to be matched to a region of the $1^{st}$ Tx RB used by the Tx terminal which causes the interference.

In addition, the method may further include transmitting a transmission response signal to the Tx terminal.

In addition, the method may further include receiving a signal mapped to a communication-enabled terminal among the Tx terminals by using one of regions of the $2^{nd}$ Tx RB, and determining whether there is a signal interference caused by at least three in-group links.

In addition, the determining of whether there is the signal interference caused by the at least three in-group links may include confirming a link capable of performing D2D communication among the at least three in-group links by confirming a signal mapped to the communication-enabled terminal, and detecting a signal interference caused by a Tx terminal of the link capable of performing the D2D communication.

In addition, the detecting of the signal interference caused by the Tx terminal of the link capable of performing the D2D communication may include, if it is determined that the signal interference caused by the Tx terminal is present, mapping an inverse power echo signal to a region of the $2^{nd}$ Rx RB corresponding to an Rx terminal having a signal interference.

In accordance with another aspect of the present disclosure, a Tx terminal, linked to an Rx terminal, for performing D2D communication is provided. The Tx terminal includes a controller for confirming that the terminal is included in at least any one of groups in which links are grouped according to a link priority, and for selecting a communication mode for communicating with the Rx terminal according to whether the signal interference exists, and a communication module for receiving a result of determining whether there is a signal interference caused by at least three in-group links from the Rx terminal.

In addition, the controller may search for other terminals which perform the D2D communication. The communication module may transmit information including the number of Tx antennas and the number of Rx antennas to each of the found terminals, and receive information including the number of Tx antennas and the number of Rx antennas from the respective terminals.

In addition, the grouping may be determined by the equation of:

$$\sum_{i=1}^{K} d^{[i]}(M^{[i]} + N^{[i]} - 2d^{[i]}) \geq \sum_{i,j \in K, i \neq j}^{K} d^{[j]}d^{[i]}.$$

where K is the number of links in the group, $M^{[i]}$ is the number of antennas of the i-th Tx terminal in the group, $N^{[i]}$ is the number of antenna of the i-th Rx terminal in the group, and $d^{[i]}$ is the number of data streams transmitted from the i-th Tx terminal.

In addition, the controller may confirm that a transmission request signal to be transmitted to the Rx terminal is mapped to any one of regions of the $1^{st}$ Tx RB, and confirm the link priority by confirming a location of the region to which the transmission request signal is mapped.

In addition, the any one of the regions of the $1^{st}$ Tx RB may be any one of regions consisting of at least one OFDM symbol and at least one frequency tone.

In addition, the link priority may be increased from a lower right region to an upper left region among the regions of the $1^{st}$ Tx RB.

In addition, the communication module may transmit a transmission request signal to the Rx terminal.

In addition, the communication module may receive a transmission response signal from the Rx terminal by using one of regions of the 1st Rx RB, and transmit to the Rx terminal a signal mapped to one of regions of the 2nd Tx RB. The controller may confirm a communication-enabled terminal matched to a region in which no signal is transmitted among regions of the 1st Rx RB, and map a signal to one of regions of the 2nd Tx RB so as to be matched to a communication-enabled terminal corresponding to the confirmed communication-enabled region.

In addition, the controller may determine the number of data streams according to whether the signal interference exists.

In addition, the controller may select any one communication mode among a single user MIMO beamforming mode, a ZF beamforming mode, and an IA beamforming mode according to the determined number of data streams depending on the signal interference.

In accordance with another aspect of the present disclosure, an Rx terminal, linked to a Tx terminal, for performing D2D communication is provided. The Rx terminal includes a controller for confirming that the terminal is included in at least any one of groups in which links are grouped according to a link priority, and for performing interference checking on an out-group link, and a communication module for performing communication according to a communication mode selected by the Tx terminal.

In addition, the grouping may be determined by the equation of:

$$\sum_{i=1}^{K} d^{[i]}(M^{[i]} + N^{[i]} - 2d^{[i]}) \geq \sum_{i,j \in K, i \neq j}^{K} d^{[i]} d^{[j]}.$$

where K is the number of links in the group, $M^{[i]}$ is the number of antennas of the i-th Tx terminal in the group, $N^{[i]}$ is the number of antenna of the i-th Rx terminal in the group, and $d^{[i]}$ is the number of data streams transmitted from the i-th Tx terminal.

In addition, the communication module may receive a transmission request signal from the Tx terminal and confirm that the transmission request signal is received in any one of regions of the 1st Tx RB. The controller may confirm the link priority by confirming a location of the region in which the transmission request signal is received.

In addition, the any one of the regions of the 1st Tx RB may be any one of regions consisting of at least one OFDM symbol and at least one frequency tone.

In addition, the link priority may be increased from a lower right region to an upper left region among the regions of the 1st Tx RB.

In addition, the controller may determine whether there is a signal interference caused by at least three Tx terminals in a group having a lower priority if it is determined that the group is a highest-priority group, and map an indicator signal to a region of the 1st Rx RB assigned to a Rx terminal having the signal interference if it is determined that the signal interference caused by the at least three Tx terminals having lower priority is present.

In addition, the controller may determine whether there is a signal interference caused by at least three Tx terminals in a group having higher priority if it is determined that the group is not the highest-priority group, and map an indicator signal to one of regions of the 1st Rx RB assigned to the Rx terminal having the signal interference if it is determined that the signal interference caused by the at least three Tx terminals having higher priority is present.

In addition, the controller may determine whether there is a signal interference caused by at least three Tx terminals in a group having lower priority if it is determined that the signal interference caused by the at least three Tx terminals having higher priority is absent, and map the indicator signal to one of regions of the 1st Rx RB so as to be matched to a region of the 1st Tx RB used by the Tx terminal which causes the interference if it is determined that the interference caused by the at least three Tx terminals is present in the group having lower priority.

In addition, the communication module may transmit a transmission response signal to the Tx terminal.

In addition, the communication module may receive a signal mapped to a communication-enabled terminal among the Tx terminals by using one of regions of the 2nd Tx RB. The controller may determine whether there is a signal interference caused by at least three in-group links.

In addition, the controller may confirm a link capable of performing D2D communication among the at least three in-group links by confirming a signal mapped to the communication-enabled terminal, and detect a signal interference caused by a Tx terminal of the link capable of performing the D2D communication.

In addition, if it is determined that the signal interference caused by the Tx terminal is present, the controller may map an inverse echo signal to a region of the 2nd Rx block corresponding to an Rx terminal having a signal interference.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION

For a more complete understanding of the present disclosure and its advantages, reference is now made to the following description taken in conjunction with the accompanying drawings, in which like reference numerals represent like parts:

DETAILED DESCRIPTION

Figure 1A:
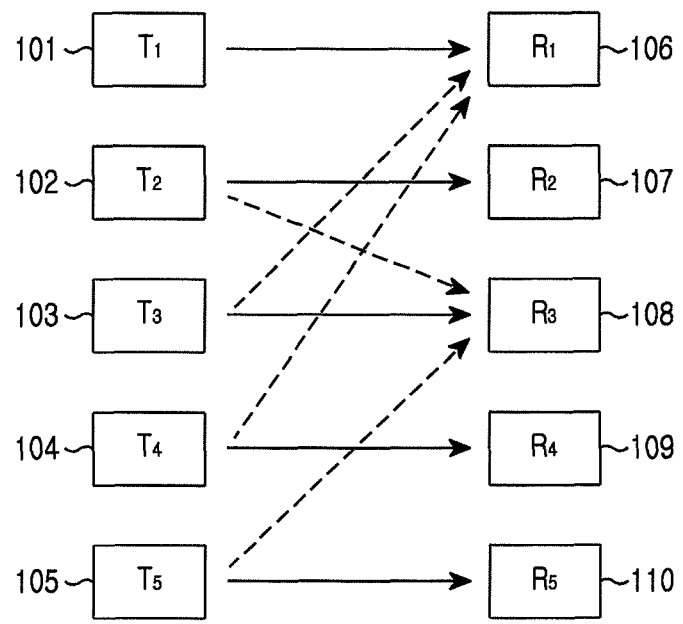
FIGS. 1A and 1B illustrate an overall structure of terminals for performing Device To Device (D2D) communication and Transmitting (Tx) resource blocks (RBs) and Receiving (Rx) RBs constituting each of the terminals according to an exemplary embodiment of the present disclosure.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein. Further, like reference numerals denote parts performing similar functions and actions through the drawings.

Figure 1B:
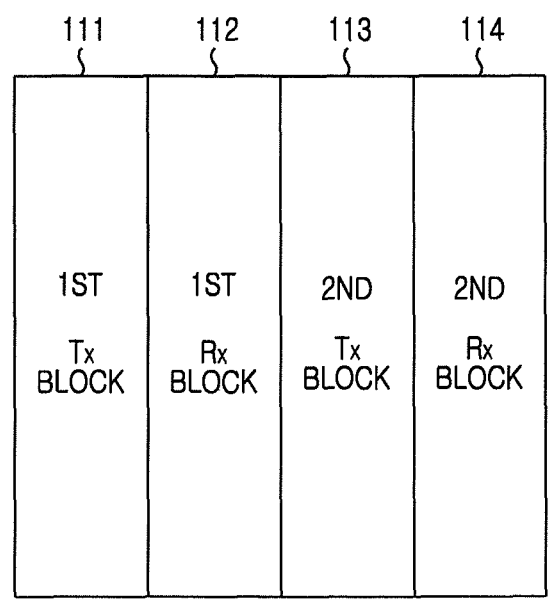

FIGS. 1A and 1B illustrate an overall structure of terminals for performing D2D communication and Transmitting (Tx) resource blocks (RBs) and Receiving (Rx) RBs constituting each of the terminals according to an exemplary embodiment of the present disclosure. FIG. 1A illustrates an overall structure of terminals for performing D2D communication according to an exemplary embodiment of the present disclosure. First, D2D communication can be defined as a communication network for performing direct communication between neighboring devices without an aid of the existing infrastructure such as an access point or the like. That is, a terminal of the present disclosure can perform D2D communication, and can perform direct communication with respect to a neighboring terminal without an aid of an access point or the like. In addition, the present disclosure relates to link scheduling in a D2D communication network. A link scheduling technique can be defined as a technique for determining a certain link to be used for communication at a given time slot on the basis of a current traffic and channel state of each D2D link. Advantageously, the D2D network can minimize an inter-link interference by using the link scheduling, and can effectively reuse the same resource.

As illustrated in FIG. 1A, assume that 10 terminals can perform direct communication with each another without an aid of an access point or the like. In addition, Tx terminals are indicated by T1 to T5 and Rx terminals are indicated by R1 to R5 since a single-tone OFDM signal generation method is applied in the present disclosure. More specifically, this is because a Tx terminal of a D2D link broadcasts an analog transmission request signal via a Tx RB, and an Rx terminal of the D2D link listens signals of the Tx RB, determines whether D2D communication is possible on the basis of the signals, and transmits a transmission response signal at the same tone location of an Rx RB in the present disclosure. That is, a terminal 101 indicated by T1 transmits a transmission request signal to a terminal 106 indicated by R1 by using a $1^{st}$ frequency tone of a $1^{st}$ OFDM symbol of the Tx RB. In addition, a terminal 102 indicated by T2 transmits a transmission request signal to a terminal 107 indicated by R2 by using a $2^{nd}$ frequency tone of the $1^{st}$ OFDM symbol of the Tx RB, and a terminal 103 indicated by T3 transmits a transmission request signal to a terminal 108 indicated by R3 by using a $3^{rd}$ frequency tone of the $1^{st}$ OFDM symbol of the Tx RB. In addition, a terminal 104 indicated by T4 transmits a transmission request signal to a terminal 109 indicated by R4 by using a $4^{th}$ frequency tone of the $1^{st}$ OFDM symbol of the Tx RB, and a terminal 105 indicated by T5 transmits a transmission request signal to a terminal 110 indicated by R5 by using a $5^{th}$ frequency tone of the $1^{st}$ OFDM symbol of the Tx RB.

Similarly, the terminal 106 indicated by R1 transmits a transmission response signal to the terminal 101 indicated by T1 by using a $1^{st}$ frequency tone of a $1^{st}$ OFDM symbol of the Rx RB. In addition, the terminal 107 indicated by R2 transmits a transmission response signal to the terminal 102 indicated by T2 by using a $2^{nd}$ frequency tone of the $1^{st}$ OFDM symbol of the Rx RB, and the terminal 108 indicated by R3 transmits a transmission response signal to the terminal 103 indicated by T3 by using a $3^{rd}$ frequency tone of the $1^{st}$ OFDM symbol of the Rx RB. In addition, the terminal 104 indicated by R4 transmits a transmission response signal to the terminal 104 indicated by T4 by using a $4^{th}$ frequency tone of the $1^{st}$ OFDM symbol of the Rx RB, and the terminal 110 indicated by R5 transmits a transmission response signal to the terminal 105 indicated by T5 by using a $5^{th}$ frequency tone of the $1^{st}$ OFDM symbol of the Rx RB. Hereinafter, the terminals will be denoted by Tn terminals and Rn terminals for convenience of explanation.

As illustrated in FIG. 1A, the T1 terminal 101 and the R1 terminal 106, the T2 terminal 102 and the R2 terminal 107, the T3 terminal 103 and the R3 terminal 108, the T4 terminal 104 and the R4 terminal 109, and the T5 terminal 105 and the R5 terminal 110 are linked (as indicated by a solid line) with each other. A state in which the T1 terminal 101 to the T5 terminal 105 transmit signals to the R1 terminal 106 to the R5 terminal 110 is shown in the present embodiment. The T1 terminal 101 to the T5 terminal 105 are Tx terminals, and the R1 terminal 106 to the R5 terminal 110 are Rx terminals.

More specifically, in the exemplary embodiment of FIG. 1A, during the R1 terminal 106 linked to the T1 terminal 101 receives a transmission request signal from the T1 terminal 101, the R1 terminal 106 has a signal interference caused by the T3 terminal 103 and the T4 terminal 104 which exist on the same D2D communication network. In addition, during the R3 terminal 108 linked to the T3 terminal 103 receives a transmission request signal from the T3 terminal 103, the R3 terminal 108 has a signal interference caused by the T2 terminal 102 and the T5 terminal 105 which exist on the same D2D communication network. In the aforementioned example, there is a conventional problem in that communication cannot be smoothly performed in the presence of a signal interference caused by another terminal existing on the D2D communication network. However, the present disclosure performs grouping on D2D links according to a link priority, so that interference checking is performed only an out-group link and signal interference checking is performed on an in-group link capable of performing D2D communication. That is, since a linked terminal selects the most suitable Tx/Rx mode by performing the interference checking and the signal interference checking respectively on the in-group link and the out-group link, there is an advantage in that communication can be performed smoothly without signal interference.

FIG. 1B illustrates an example of a Tx RB and an Rx RB which constitute each terminal according to an exemplary embodiment of the present disclosure. Referring to FIG. 1B, the Tx RB and the Rx RB of the present disclosure may consist of a $1^{st}$ Tx RB 111, a $1^{st}$ Rx RB 112, a $2^{nd}$ Tx RB 113, and a $2^{nd}$ Rx RB 114. In the present disclosure, a resource for link scheduling uses the Tx RB and the Rx RB. More specifically, in the present disclosure, each RB may consist of 4 OFDM symbols and 28 frequency tones, and may consist of the two Tx RBs 111 and 113 and the two Rx RBs 112 and 114.

First, the $1^{st}$ Tx RB 111 is used when a Tn terminal transmits a transmission request signal to an Rn terminal. More specifically, each Tn terminal transmits the transmission request signal to the Tn's linked Rn terminal by mapping the transmission request signal to any one of regions of the $1^{st}$ Tx RB 111. That is, the Tn terminal transmits the transmission request signal to the Tn's linked Rn terminal by mapping the transmission request signal to any one of the regions of the $1^{st}$ Tx RB 111 which may consist of 4 OFDM symbols and 28 frequency tones. In addition, the $1^{st}$ Tx RB 111 is used when the Rn terminal receives the transmission request signal from the Tn terminal. More specifically, when the Tn terminal transmits the transmission request signal by mapping the transmission request signal to any one of the regions of the $1^{st}$ Tx RB 111, the Rn terminal receives the transmission request signal by using a region of the $1^{st}$ Tx RB 111 matched to the region to which the transmission request signal is mapped.

The $1^{st}$ Rx RB 112 is used when a transmission response signal from the $1^{st}$ Tx RB 111 is mapped in order for the Rn terminal to transmit the transmission response signal to the Tn terminal. More specifically, upon receiving the transmission request signal from the Tn terminal by using the $1^{st}$ Tx RB 111, the Rn terminal determines whether D2D communication is possible on the basis of the received transmission request signal and maps the transmission response signal to the same tone location of the $1^{st}$ Rx RB 112. Herein, the process in which the Rn terminal determines whether the D2D communication is possible on the basis of the transmission request signal received from the Tn terminal is a process of performing interference checking to determine whether there is a signal interference caused by an out-group link. That is, the $1^{st}$ Rx RB 112 is used when the Rn terminal performs the interference checking on the out-group link and thereafter maps the transmission response signal. In addition, the $1^{st}$ Rx RB 112 is also used when the Rn terminal transmits the transmission response signal to the Tn terminal. More specifically, the Rn terminal performs the interference checking on the out-group link, and then maps the transmission response signal to the $1^{st}$ Rx RB 112. Thereafter, the Rn terminal transmits to the Tn terminal the transmission response signal mapped to the $1^{st}$ Rx RB 112. In addition, the $1^{st}$ Rx RB 112 is also used when the Tn terminal receives the mapped transmission response signal from the Rn terminal.

The $2^{nd}$ Tx RB 113 is used when a signal is mapped to a region corresponding to communication-enabled Tx terminals among Tn terminals and the mapped signal is transmitted to an Rn terminal. More specifically, the Tn terminal receives a transmission response signal from the Rn terminal by using the $1^{st}$ Rx RB 112, confirms communication-enabled Tx terminals corresponding to a region in which no signal is transmitted among regions of the $1^{st}$ Rx RB 112, and maps a signal to the $2^{nd}$ Tx RB 113 so as to be matched to the confirmed communication-enabled terminal. Thereafter, the communication-enabled Tx terminal transmits the mapped signal to the Rn terminal by using the $2^{nd}$ Tx RB 113. In addition, the $2^{nd}$ Tx RB 113 is used when the Rn terminal receives a mapped signal from the Tn terminal. More specifically, when the Tn terminal maps a signal to the $2^{nd}$ Tx RB 113 so as to be matched to the communication-enabled terminal and then transmits the signal to the Rn terminal, the Rn terminal uses the $2^{nd}$ Tx RB 113 to receive the signal transmitted from the Tn terminal.

The $2^{nd}$ Rx RB 114 is used when a result of determining whether the Rn terminal has a signal interference caused by an in-group link is considered. More specifically, the Rn terminal receives a signal mapped to the communication-enabled terminal from the Tn terminal by using the $2^{nd}$ Tx RB 113. Thereafter, the Rn terminal determines whether the signal interference caused by the out-group link is present, and displays the detection result to the $2^{nd}$ Rx RB 114. In addition, the $2^{nd}$ Rx RB 114 is used when the Tn terminal receives from the Rn terminal a result of determining whether there is a signal interference caused by an out-group link. As described above, since each terminal employs the two Tx RBs 111 and 113 and the two Rx RBs 112 and 114, the present disclosure has an advantage in that a scheduling result is more accurate than the conventional terminal employing one Tx-Rx RB.

Figure 2:
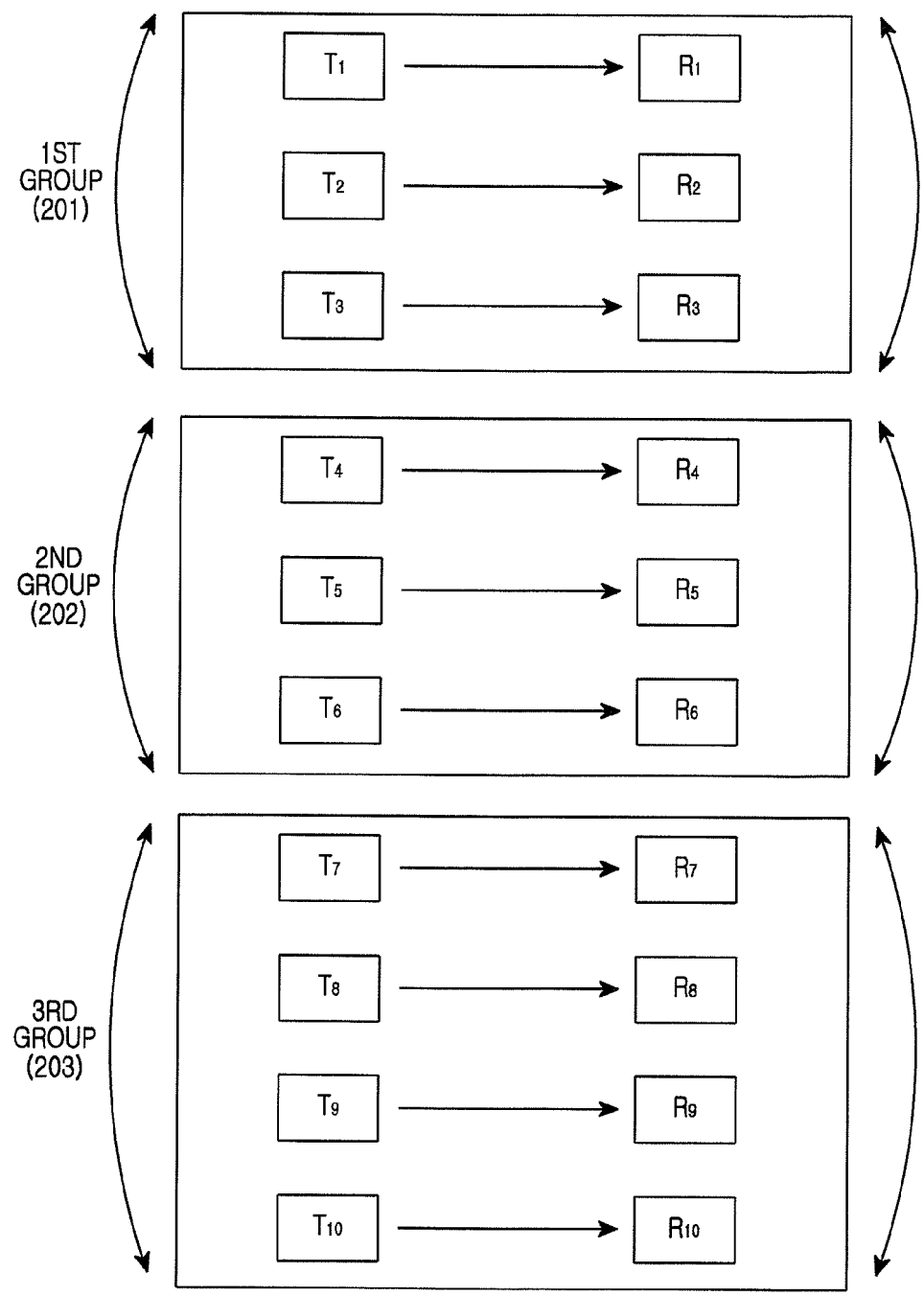
FIG. 2 illustrates an example of grouping links constituting a D2D communication network according to an exemplary embodiment of the present disclosure.

FIG. 2 illustrates an example of grouping links constituting a D2D communication network according to an exemplary embodiment of the present disclosure. The grouping can be defined in the present disclosure that at least three links are grouped into at least one group according to a link priority of the links constituting the D2D communication network. Herein, the grouping is determined by Equation (1) below.

$$\sum_{i=1}^{K} d^{[i]}(M^{[i]} + N^{[i]} - 2d^{[i]}) \geq \sum_{i,j \in K, i \neq j}^{K} d^{[j]}d^{[i]} \quad (1)$$

Herein, K is the number of links in the group, $M^{[i]}$ is the number of antennas of the i-th Tx terminal in the group, $N^{[i]}$ is the number of antenna of the i-th Rx terminal in the group, and $d^{[i]}$ is the number of data streams transmitted from the i-th Tx terminal.

If all in-group Tx/Rx terminals have the same number of antennas, it can be simply defined by Equation (2) below.

$$M+N-(K+1)d \geq 0 \qquad (2)$$

Herein, M denotes the number of in-group Tx antennas, N denotes the number of in-group Rx antennas, K denotes the number of in-group links, and d denotes the number of in-group transmissible/receivable data streams.

More specifically, if it is assumed that M and N are specific values when M is the number of in-group Tx antennas and N is the number of in-group Rx antennas, k and d can be obtained relatively when k is the number of in-group links and d is the number of in-group transmissible/receivable data streams. For example, if it is assumed that the number of Tx antennas and the number of Rx antennas, that is, M and N, are both 2, the number of in-group links and the number of in-group transmissible/receivable data streams can be obtained relatively. That is, if it is intended to set the number of in-group links to 3, then 1 is obtained as the value d, i.e., the number of in-group transmissible/receivable data streams, by substituting 2 for the values M and N and by substituting 3 for the value k in Equation 2 above. Likewise, if it is intended to set the number of transmissible/receivable data streams to 1, then 3 can be obtained as the value k, i.e., the number of in-group links, by substituting 2 for the values M and N and by substituting 1 for the value d in Equation (2) above.

In the present embodiment, 10 links can be grouped into three groups according to Equation (2) above. More specifically, it is assumed that the number of in-group Tx antennas and the number of in-group Rx antennas are both 2, and the number of in-group transmissible/receivable data streams is 1. Therefore, three links are grouped to a $1^{st}$ group 201 having a highest link priority, and three links are grouped to a $2^{nd}$ group 202 having a second-highest link priority. The remaining four links are grouped into one group, i.e., a $3^{rd}$ group 203 having a lowest link priority. That is, as can be derived from Equation (2) above, at least three links can be located in one group. Therefore, the $3^{rd}$ group 203 is obtained by grouping four links, including the remaining one link, into one group.

As described above, 10 D2D links can be grouped into two groups 201 and 202 consisting of three links and one group 203 consisting of four links. Herein, terminals grouped to each group can confirm a link priority by confirming a location of a transmission request signal mapped to any one of regions of a $1^{st}$ Tx RB. More specifically, in order for a Tn terminal to transmit the transmission request signal to an Rn terminal, the transmission request signal is mapped to any one of regions of the $1^{st}$ Tx RB, and in this case, the Tn terminal may confirm a location of the transmission request signal mapped to any one of the regions of the $1^{st}$ Tx RB and then confirm a link priority by recognizing a location of a group to which the Tn terminal belongs. Herein, any one of the regions of the Tx RB refers to any one region among 112 regions consisting of 4 OFDM symbols and 28 frequency tones. For example, if it is assumed that the number of Tx antennas and the number of Rx antennas are both 2 and the number of transmissible/receivable data streams is 1, a T4 terminal which maps the transmission request signal to a region of a $4^{th}$ frequency tone of a $1^{st}$ OFDM symbol of the Tx RB can confirm that it is grouped to the $2^{nd}$ group and that the number of in-group links is 3.

Herein, the aforementioned information on Tx/Rx antennas can be transmitted and received in a link search process between terminals for performing D2D communication. More specifically, terminals on a D2D communication network search for other terminals capable of performing D2D communication, transmit information including the number of Tx antennas and the number of Rx antennas of the respective found terminals, and receive information including the number or Tx antennas and the number of Rx antennas from the respective terminals. Therefore, as described above, each of the terminals can confirm a group to which the terminal belongs by confirming a link priority.

Figure 3:
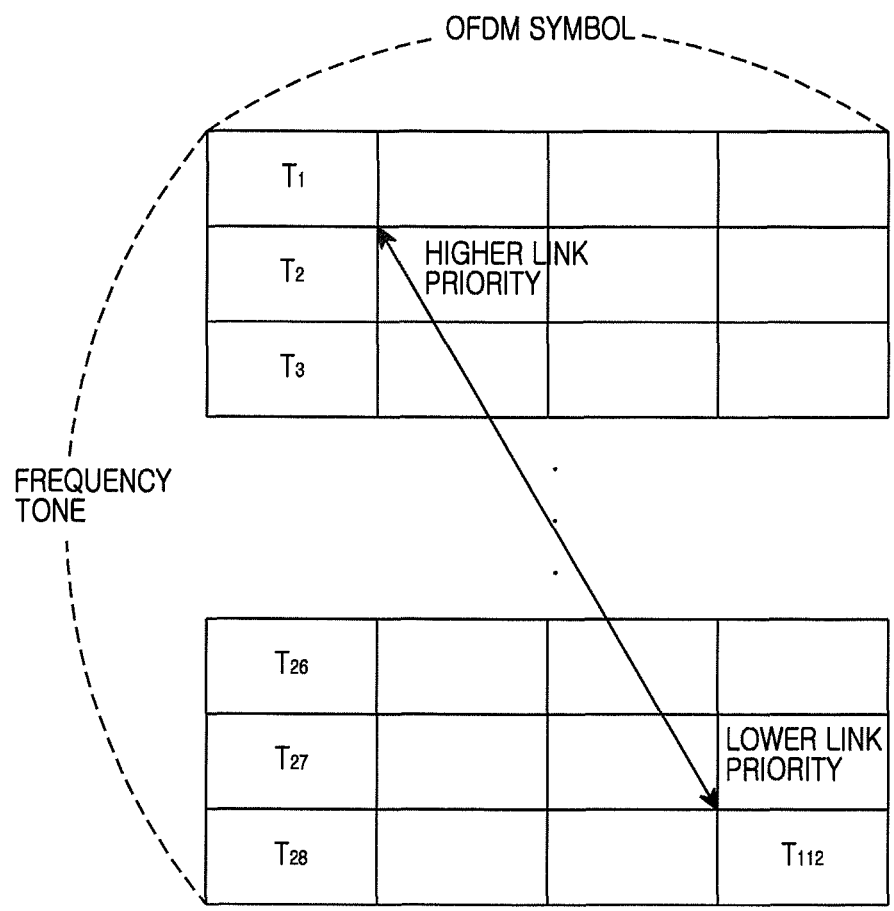
FIG. 3 illustrates a relation between a link priority and a location of the $1^{st}$ Tx RB according to an exemplary embodiment of the present disclosure.
Figure 4:
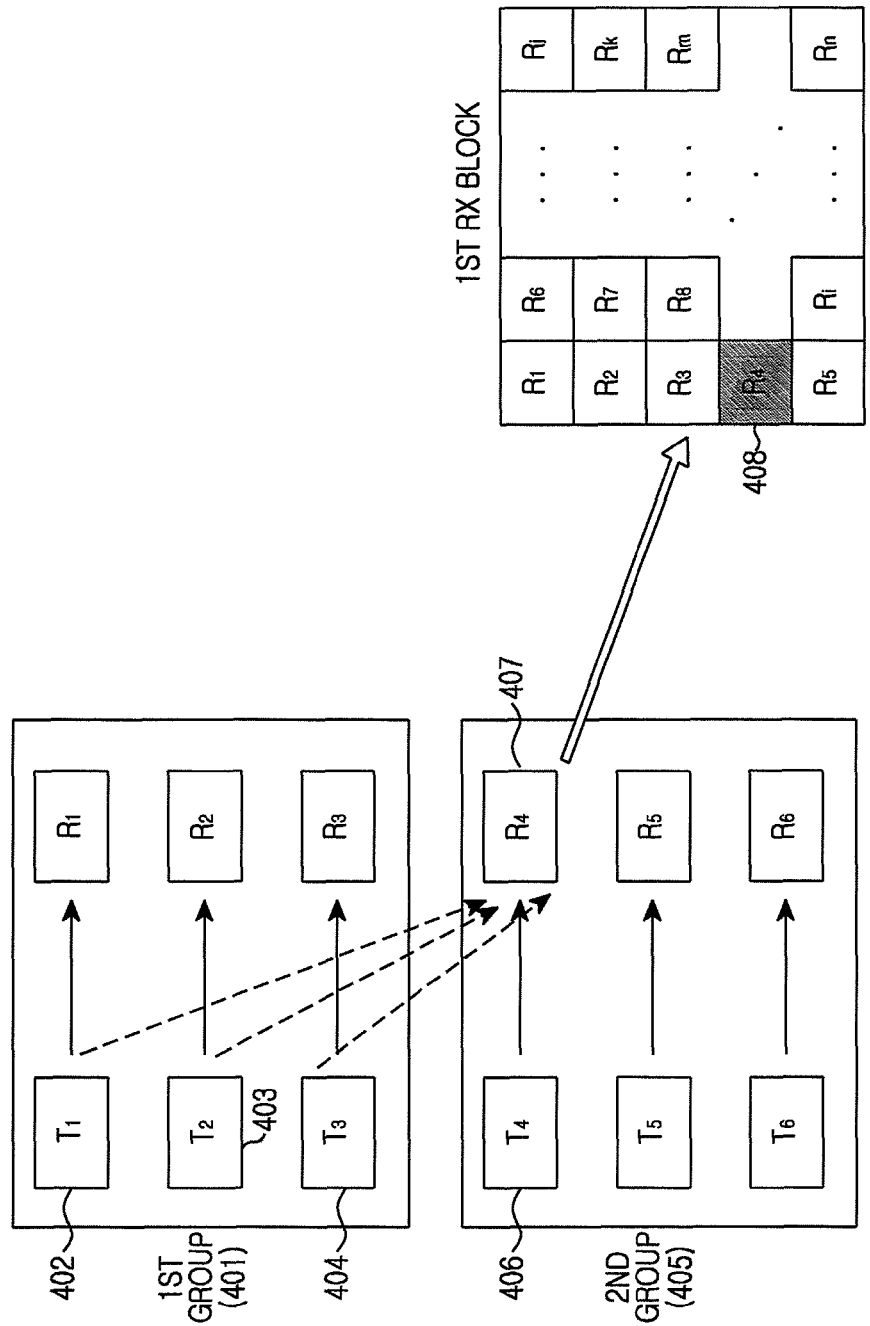
FIGS. 4A and 4B illustrate an example of mapping an indicator signal to a tone of the $1^{st}$ Rx RB by performing interference checking on an out-group higher-priority link according to an exemplary embodiment of the present disclosure.
Figure 5:
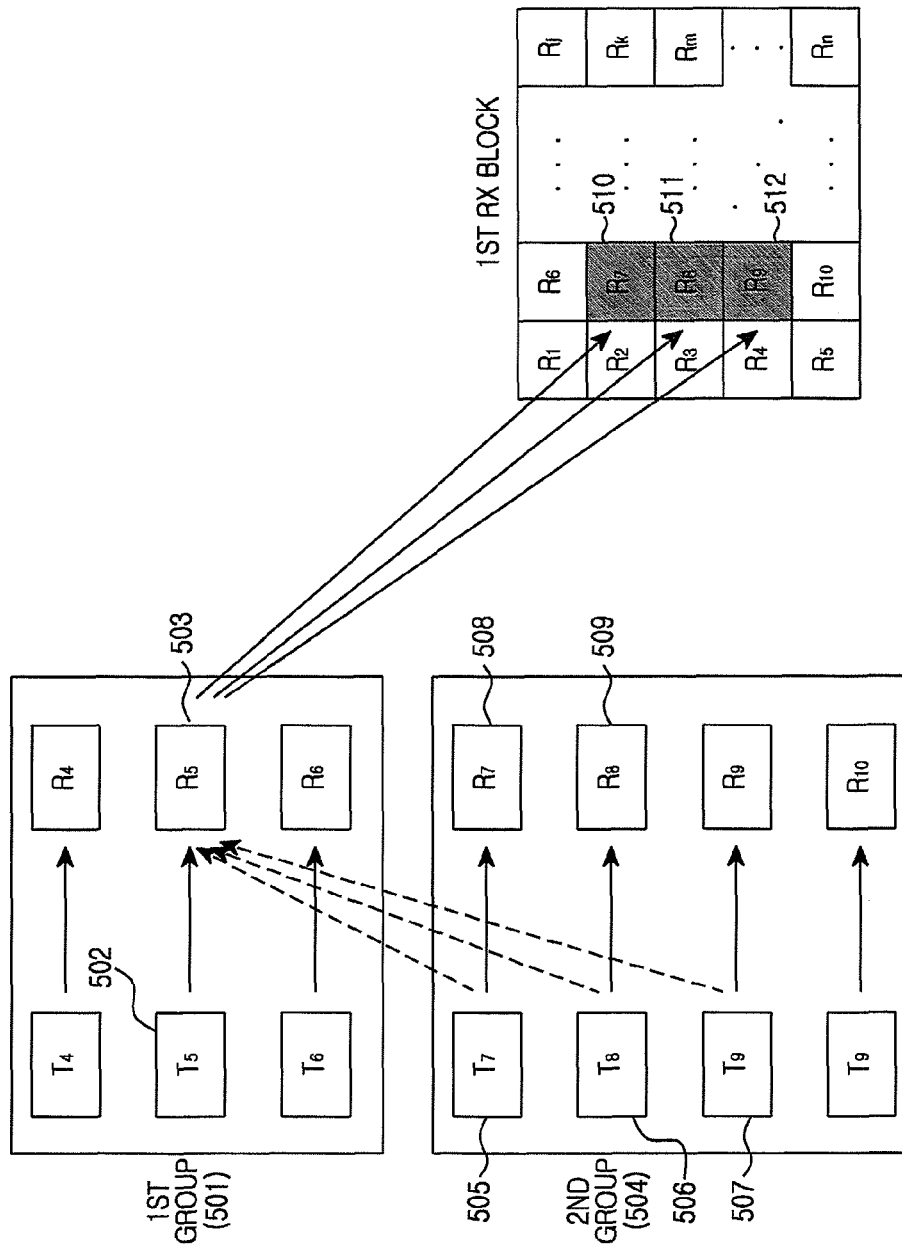
FIGS. 5A and 5B illustrate an example of mapping an indicator signal to a tone of the $2^{nd}$ Rx RB by performing interference checking on an out-group lower-priority link according to an exemplary embodiment of the present disclosure.

FIG. 3 illustrates a relation between a link priority and a location of a Tx RB according to an exemplary embodiment of the present disclosure. Referring to FIG. 3, the Tx RB of the present disclosure may consist of 4 OFDM symbols and 28 frequency tones. That is, one Tx RB may consist of 4 OFDM symbols in an X axis and 28 frequency tones in a Y axis, and thus can consist of 112 regions in total. Although a structure of the Tx RB is illustrated in FIG. 3, it is apparent that an Rx RB can also be configured in the same structure. The present disclosure may also have a structure consisting of two Tx RBs and two Rx RBs. That is, each terminal according to the present disclosure has two Tx RBs and two Rx RBs, and thus the present disclosure has an advantage in that a scheduling result is more accurate than the conventional terminal employing one Tx-Rx RB.

The relation of the location of the Tx RB and the link priority is characterized in that the link priority is increased from a lower right region to an upper left region among the regions of the Tx RB. More specifically, a highest link priority is assigned to a T1 terminal which maps a transmission request signal to a location of a $1^{st}$ frequency tone of a $1^{st}$ OFDM symbol, and a lowest link priority is assigned to a T112 terminal which maps the transmission request signal to a location of a $28^{th}$ frequency tone of a $4^{th}$ OFDM symbol. That is, the T1 terminal is grouped to a $1^{st}$ group and thus is assigned a highest link priority, and the T112 terminal is grouped to an $N^{th}$ group according to the number of Tx/Rx antennas and the number of transmissible/receivable data streams and thus is assigned a lowest link priority.

FIGS. 4A and 4B illustrate an example of mapping an indicator signal to a $1^{st}$ Rx RB by performing interference checking on an out-group higher link according to an exemplary embodiment of the present disclosure. FIG. 4A illustrates an example of performing interference checking on an out-group higher link according to an exemplary embodiment of the present disclosure. As illustrated in FIG. 4A, it is assumed in the present embodiment that 12 terminals are linked through 6 D2D links and transmit and receive respective transmission request signals on a D2D communication network. In addition, it is also assumed that the number of Tx antennas and the number of Rx antennas are both 2, and the number of data streams to be transmitted is 1. When the aforementioned condition is substituted to Equation (2), it can be known that the 6 D2D links on the D2D communication network are grouped into two groups. That is, a $1^{st}$ group 401 consists of three links in which a T1 terminal and an R2 terminal, a T2 terminal and an R2 terminal, and a T3 terminal and an R3 terminal are connected to each other, and a $2^{nd}$ group 405 consists of three links in which a T4 terminal and an R4 terminal, a T5 terminal and an R5 terminal, and a T6 terminal and an R6 terminal are connected to each other.

Herein, the interference checking can be defined as an operation in which an Rn terminal for receiving a transmission request signal determines whether there is a signal interference caused by Tx terminals belonging to a group other than a group to which the Rn terminal belongs. More specifically, the Rn terminal determines whether there is a signal interference caused by Tx terminals of an out-group higher link and Tx terminals of an out-group lower link, excluding Tx terminals in the group to which the Rn terminal belongs. That is, the Rn terminal determines whether there is a signal interference caused by links included in a group having a higher priority than the group to which the Rn terminal belongs, and thereafter if it is determined that there is no signal interference caused by the links included in the higher-priority group, determines again whether there is a signal interference caused by links included in a lower-priority group. The present embodiment shows a process of determining whether there is a signal interference caused by links included in a group having a higher priority than a group to which a corresponding Rn terminal belongs.

As illustrated in FIG. 4A, an Rn terminal included in the $1^{st}$ group 401 corresponds to a highest-priority group and thus does not determine whether there is a signal interference caused by links included in the higher-priority group. An Rn terminal included in the $2^{nd}$ group 405 determines whether there is a signal interference caused by Tx terminals included in the $1^{st}$ group 401 having links with a higher link priority. An R4 terminal 407 linked to a T4 terminal 406 can confirm that there is a signal interference caused by three Tx terminals 402, 403, and 404 included in a group having a higher priority than the R4 terminal 407. However, the remaining R5 and R6 terminals can confirm that there is no signal interference caused by the three Tx terminals 402, 403, and 404 included in the $1^{st}$ group 401.

FIG. 4B illustrates an example of mapping an indicator signal to a $1^{st}$ Rx RB by performing interference checking on an out-group higher link according to an exemplary embodiment of the present disclosure. As illustrated in FIG. 4B, an R4 terminal confirms that there is a signal interference caused by Tx terminals belonging to a group having a higher priority than the R4 terminal in the aforementioned example, and maps the indicator signal to the $1^{st}$ Rx RB assigned to an Rx terminal which has the signal interference. That is, the R4 terminal confirms that there is a signal interference caused by a T1 terminal, a T2 terminal, and a T3 terminal, and maps the indicator signal to a region 408 of a $4^{th}$ frequency tone of a $1^{st}$ OFDM symbol of the $1^{st}$ Rx RB assigned to the R4 terminal.

FIGS. 5A and 5B illustrate an example of mapping an indicator signal to a $2^{nd}$ Rx RB by performing interference checking on an out-group lower link according to an exemplary embodiment of the present disclosure. FIG. 5A illustrates an example of performing interference checking on an out-group lower link according to an exemplary embodiment of the present disclosure. As illustrated in FIG. 5A, it is assumed in the present embodiment that 14 terminals are linked through 7 D2D links and transmit and receive respective transmission request signals on a D2D communication network. In addition, it is also assumed that the number of Tx antennas and the number of Rx antennas are both 2, and the number of data streams to be transmitted is 1. When the aforementioned condition is substituted to Equation (2), it can be known that the 7 D2D links on the D2D communication network are grouped into two groups. That is, a $1^{st}$ group 501 consists of three links in which a T4 terminal and an R4 terminal, a T5 terminal and an R5 terminal, and a T6 terminal and an R6 terminal are connected to each other, and a $2^{nd}$ group 504 consists of four links in which a T7 terminal and an R7 terminal, a T8 terminal and an R8 terminal, a T9 terminal and an R9 terminal, and a T10 terminal and an R10 terminal are connected to each other.

Herein, the interference checking can be defined as an operation in which an Rn terminal for receiving a transmission request signal determines whether there is a signal interference caused by Tx terminals belonging to a group other than a group to which the Rn terminal belongs. More specifically, the Rn terminal determines whether there is a signal interference caused by Tx terminals of an out-group higher link and Tx terminals of an out-group lower link, excluding Tx terminals in the group to which the Rn terminal belongs. That is, the Rn terminal determines whether there is a signal interference caused by links included in a group having a higher priority than the group to which the Rn terminal belongs, and thereafter if it is determined that there is no signal interference caused by the links included in the higher-priority group, determines again whether there is a signal interference caused by links included in a lower-priority group. The present embodiment shows a process of determining whether there is a signal interference caused by links included in a lower-priority group than a group to which a corresponding Rn terminal belongs.

As illustrated in FIG. 5A, an Rn terminal included in the $2^{nd}$ group 504 corresponds to a lowest priority group and thus does not determine whether there is a signal interference caused by links included in a lower-priority group. An Rn terminal included in the $1^{st}$ group 501 determines whether there is a signal interference caused by Tx terminals included in the $2^{nd}$ group 504 having links with a lower link priority. An R5 terminal 503 linked to a T5 terminal 502 can confirm that there is a signal interference caused by three Tx terminals 505, 506, and 507 included in a lower-priority group than the R5 terminal 503. However, the remaining R4 and R6 terminals can confirm that there is no signal interference caused by the three Tx terminals 505, 506, and 507 included in the $2^{nd}$ group 504.

FIG. 5B illustrates an example of mapping an indicator signal to a $1^{st}$ Rx RB by performing interference checking on an out-group lower link according to an exemplary embodiment of the present disclosure. As illustrated in FIG. 5B, an R5 terminal confirms that there is a signal interference caused by Tx terminals belonging to a lower-priority group than the R5 terminal in the aforementioned example, and maps the indicator signal to the $1^{st}$ Rx RB so as to be matched to a region of a $1^{st}$ Tx RB used by a Tx terminal which causes the signal interference. That is, the R5 terminal confirms that there is a signal interference caused by a T7 terminal, a T8 terminal, and a T9 terminal, and maps the indicator signal to $1^{st}$ Rx RBs 510, 511, and 512 so as to be matched to regions of the $1^{st}$ Tx RB used by each Tx terminal which causes the signal interference.

Figure 6:
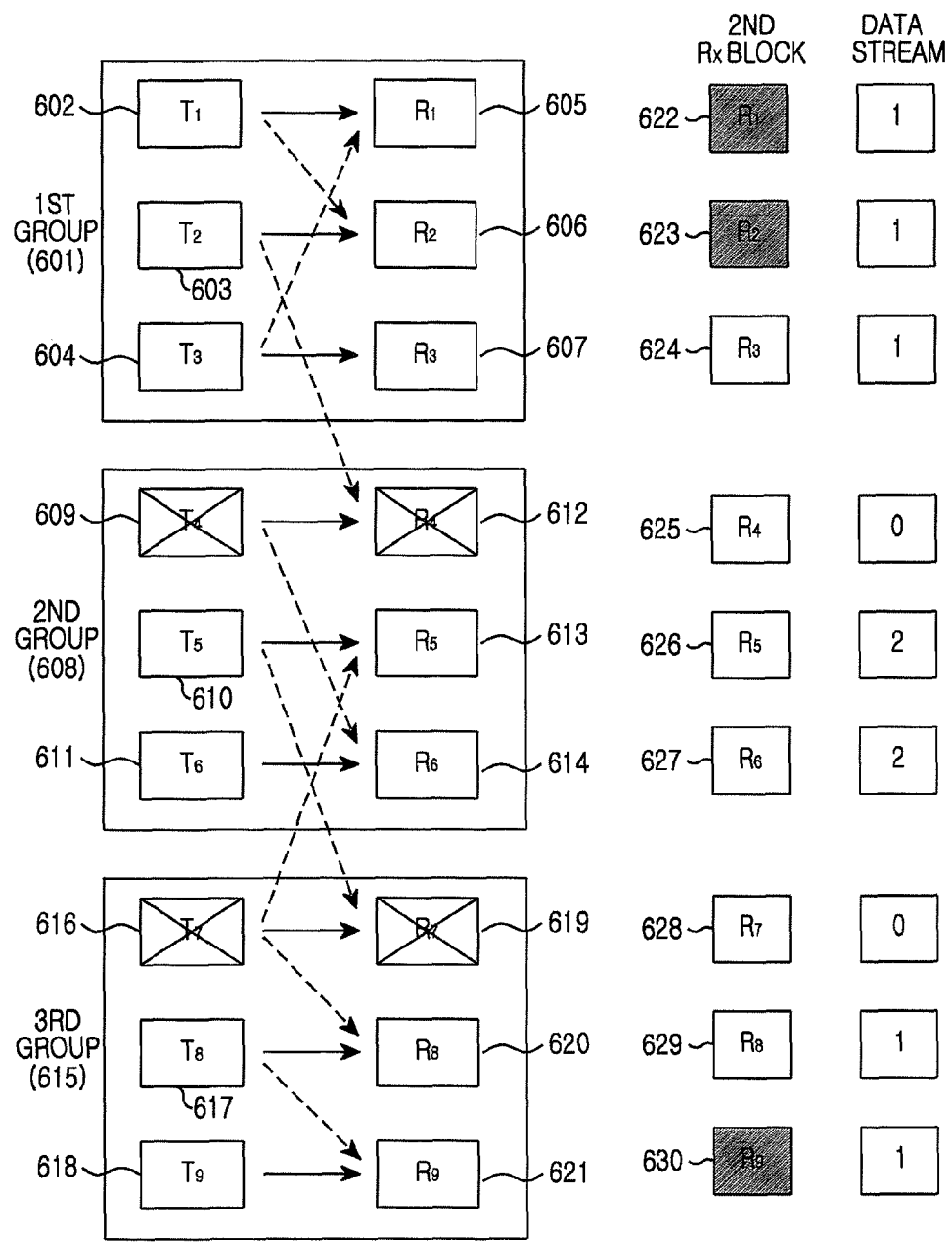
FIG. 6 illustrates an example of mapping an inverse power echo signal to a tone of the Rx RB by determining whether there is a signal interference caused by an in-group link according to an exemplary embodiment of the present disclosure.

FIG. 6 illustrates an example of mapping an inverse echo signal to an Rx RB by determining whether there is a signal interference caused by an in-group link according to an exemplary embodiment of the present disclosure. As illustrated in FIG. 6, it is assumed in the present embodiment that 18 terminals are linked through 9 D2D links and transmit and receive signals on a D2D communication network. In addition, it is also assumed that the number of Tx antennas and the number of Rx antennas are both 2, and the number of in-group links is 3. When the aforementioned condition is substituted to Equation (2), it can be known that the 6 D2D links on the D2D communication network are grouped into three groups. That is, a $1^{st}$ group 601 consists of three links in which a T1 terminal 602 and an R1 terminal 605, a T2 terminal 603 and an R2 terminal 606, and a T3 terminal 604 and an R3 terminal 607 are connected to each other, and a $2^{nd}$ group 608 consists of three links in which a T4 terminal 609 and an R4 terminal 612, a T5 terminal 610 and an R5 terminal 613, and a T6 terminal 611 and an R6 terminal 614 are connected to each other. In addition, a $3^{rd}$ group 615 consists of three links in which a T7 terminal 616 and an R7 terminal 619, a T8 terminal 617 and an R8 terminal 620, and a T9 terminal and an R9 terminal 621 are connected to each other. In addition, it is assumed in the present embodiment that the T4 terminal 609 and the T7 terminal 616 are determined as terminals that cannot perform D2D communication as a result of interference checking from the out-group link described above.

Herein, checking of a signal interference caused by an in-group link can be defined as an operation in which an Rn terminal for receiving a transmission request signal determines whether there is a signal interference caused by Tx terminals in a group to which the Rn terminal belongs. More specifically, the Rn terminal receives from the Tn terminal a signal mapped to a communication-enabled terminal, confirms a link capable of performing D2D communication among at least three in-group links, and detects a signal interference caused by a Tx terminal of a link capable of performing D2D communication. That is, if it is determined that the signal interference caused by the Tx terminal is present, the process of detecting the signal interference caused by the Tx terminal of the link capable of performing D2D communication maps an inverse echo signal to the $2^{nd}$ Rx RB matched to a region of the $2^{nd}$ Tx RB used when a communicable signal is received.

A signal interference caused by an in-group link is detected for each group as described below according to the aforementioned example. First, in the $1^{st}$ group 601 having a highest link priority, it can be confirmed that the R1 terminal 605 has a signal interference caused by the in-group T3 terminal 604. In addition, it can be confirmed that the R2 terminal 606 also has a signal interference caused by the in-group T1 terminal 602. However, it can be confirmed that the R3 terminal 607 does not have a signal interference caused by another Tx terminal. Herein, terminals such as the R1 terminal 605 and the R2 terminal 606 which are confirmed not to have a signal interference caused by another in-group Tx terminal map inverse echo signals to $2^{nd}$ Rx RBs 622 and 623 matched to regions of a $2^{nd}$ Tx RB used when a communicable signal is received.

In the process of checking the signal interference in the 2nd group 608 having a second-highest link priority, it can be confirmed that the R4 terminal 612 and the R5 terminal 613 do not have a signal interference caused by an in-group Tx terminal. Of course, although the R6 terminal 614 has a signal interference caused by the T4 terminal 609 which is the in-group Tx, since it is assumed that the T4 terminal 609 is determined as a terminal which cannot perform D2D communication through interference checking from an out-group link, the R6 terminal 614 is not affected by the signal interference of the T4 terminal 609. In addition, the R4 terminal 612 and the R5 terminal 613 have an interference respectively from the T2 terminal 603 and the T7 terminal 616, whereas the T2 terminal 603 and the T7 terminal 616 are not considered in this checking process since these terminals are out-group Tx terminals. Further, the T7 terminal 616 is also determined as a terminal which cannot perform D2D communication through interference checking from the out-group link similarly to the T4 terminal 609. Therefore, the R4 terminal 612, the R5 terminal 613, and the R6 terminal 614 do not map an inverse echo signal to a 2nd Rx RB matched to a 2nd Tx RB used when respective communicable signals are received.

In the process of detecting the signal interference in the $3^{rd}$ group 615 having a lowest link priority, it can be confirmed that the R8 terminal 620 and the R9 terminal 621 have a signal interference respectively from the T7 terminal 616 and the T8 terminal 617 which are in-group Tx terminals. However, although the R9 terminal 620 has a signal interference caused by the T7 terminal 616, as described above, the T7 terminal 616 is not considered in this checking process since it is determined as a terminal that cannot perform D2D communication through interference checking from an out-group link. The R7 terminal 619 has a signal interference caused by the T5 terminal 610, whereas the T5 terminal 610 is not considered in this checking process since it is an out-group Tx terminal. Therefore, only the R9 terminal 621 has a signal interference caused by the in-group Tx terminal in the $3^{rd}$ group 615, and thus the R9 terminal 621 maps an inverse echo signal to the $2^{nd}$ Rx RB 630 matched to a region of the $2^{nd}$ Tx RB used when a communicable signal is received.

The number of data streams matched to respective $2^{nd}$ Rx RBs is determined according to whether an inverse echo signal is mapped to each of the $2^{nd}$ Rx RBs. That is, if the inverse echo signal is mapped to the $2^{nd}$ Rx RB, the number of data streams is 1, and if the inverse echo signal is not mapped to the $2^{nd}$ Rx RB, the number of data streams is 2. In the example of FIG. 6, regarding the R1 region 622, the R2 region 623, and the R9 region 630 of the $2^{nd}$ Rx RB, the number of data streams is 1 since the inverse echo signal is mapped to the $2^{nd}$ Rx RB. On the other hand, regarding the R5 region 626 and the R6 region 627 of the $2^{nd}$ Rx RB, the number of data streams is 2 since the inverse echo signal is not mapped to the $2^{nd}$ Rx RB. In addition, since the R4 terminal 612 and the R7 terminal 619 are determined as terminals which cannot perform D2D communication, the number of data streams is 0. However, although each of the R3 terminal 607 and the R8 terminal 620 does not have an inverse echo signal mapped to the $2^{nd}$ Rx RB, the number of data streams is 1 since the T3 terminal 604 and the T8 terminal 617 which are Tx terminals linked respectively to the R3 terminal 607 and the R8 terminal 620 cause a signal interference to in-group terminals, i.e., the R1 terminal 605 and the R9 terminal 621.

In addition, Tn terminals capable of performing D2D communication select a communication mode according to whether the inverse echo signal is mapped to the $2^{nd}$ Rx RB. More specifically, the Tn terminals operate in a Zero Forcing (ZF) or Interference Alignment (IA) mode when the inverse echo signal is received at their tone locations. Otherwise, when the inverse echo signal is not received at their tone locations, the Tn terminals determine whether they cause signal interference to other in-group links. In this case, when causing the interference, the Tn terminals operate in the ZF or IA mode, and when not causing the interference, the Tn terminals operate in a single user Multi Input Multi Output (MIMO) mode. In the example of FIG. 6, the terminals T1, T2, and T9 which receive the inverse echo signal from the R1, R2, and R9 terminals select the ZF or IA mode since the inverse echo signal is received in their tone locations, and the T3 and T8 terminals also select the ZF or IA mode since they cause a signal interference to other in-group links. However, the T5 and T6 terminals do not cause the signal interference to the other in-group links and thus operate in the single user MIMO mode.

Figure 7:
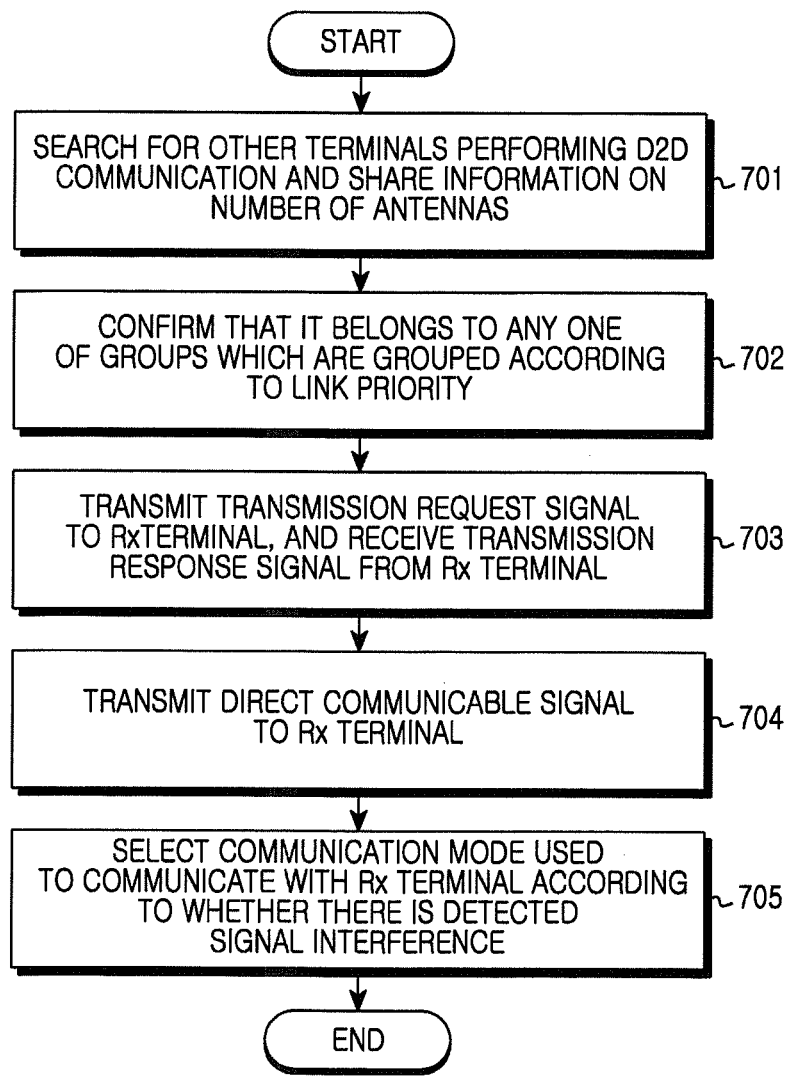
FIG. 7 illustrates a flowchart of a method of operating a Tx terminal, linked to an Rx terminal, for performing D2D communication according to an exemplary embodiment of the present disclosure.

FIG. 7 illustrates a flowchart of a method of operating a Tx terminal, linked to an Rx terminal, for performing D2D communication according to an exemplary embodiment of the present disclosure. As illustrated in FIG. 7, the Tx terminal searches for other terminals for performing D2D communication, and shares information on the number of antennas (step 701). More specifically, terminals on a D2D communication network search for other terminals capable of performing D2D communication, transmit information including the number of Tx antennas and the number of Rx antennas to each of the found terminals, and receive information including the number of Tx antennas and the number of Rx antennas from each of the terminals. Therefore, as described above, each terminal can confirm a group to which the terminal belongs by confirming a link priority.

By searching for other terminals for performing D2D communication, a Tx terminal which shares the information on the number of antennas confirms that it belongs to any one of groups which are grouped according to the link priority (step 702). More specifically, in order for a Tx terminal to transmit a transmission request signal to an Rx terminal, the transmission request signal is mapped to any one of regions of a $1^{st}$ Tx RB, and in this case, the Tx terminal may confirm a location of the transmission request signal mapped to any one of the regions of the $1^{st}$ Tx RB and then confirm a link priority by recognizing a location of a group to which the Tx terminal belongs. Herein, any one of the regions of the $1^{st}$ Tx RB refers to any one region among 112 regions consisting of 4 OFDM symbols and 28 frequency tones. For example, if it is assumed that the number of Tx antennas and the number of Rx antennas are both 2 and the number of transmissible/receivable data streams is 1, a T4 terminal which maps the transmission request signal to a region of a $4^{th}$ frequency tone of a $1^{st}$ OFDM symbol of the $1^{st}$ Tx RB can confirm that it is grouped to the $2^{nd}$ group and that the number of in-group links is 3.

Thereafter, the Tx terminal transmits the transmission request signal to Rx terminals, and then receives a transmission response signal from the Rx terminals (step 703). The $1^{st}$ Tx RB is used when the Tx terminal transmits the transmission request signal to the Rx terminals. More specifically, a $1^{st}$ terminal transmits the transmission request signal to an Rx terminal linked by mapping the transmission request signal to any one of regions of the $1^{st}$ Tx RB. That is, the Tx terminal transmits the transmission request signal to the Rx terminal linked by mapping the transmission request signal to any one of regions of the $1^{st}$ Tx RB consisting of 4 OFDM symbols and 28 frequency tones. Herein, the transmission request signal is used when the Rx terminal performs interference checking on an out-group link. In addition, the Tx terminal uses a $1^{st}$ Rx RB when receiving a transmission response signal from the Rx terminal. More specifically, when the Tx terminal transmits the transmission request signal by mapping the signal to any one of regions of the $1^{st}$ Rx RB, the Tx terminal receives the transmission request signal by using a region of the $1^{st}$ Rx RB matched with a region to which the transmission request signal is mapped.

Upon receiving the transmission response signal from the Rx terminal, the Tx terminal transmits a direct signal corresponding to a communication-enabled terminal to the Rx terminal (step 704). More specifically, the Tx terminal receives a interference checking result on an out-group link from the Rx terminal, and communication-enabled Tx terminals transmit the direct signal to the Rx terminal by mapping the signal to a $2^{nd}$ Tx RB. That is, the Tx terminal receives a transmission response signal from the Rx terminal by using the $1^{st}$ Rx RB, confirms the communication-enabled Tx terminal mapped to a region in which no signal is transmitted among regions of the $1^{st}$ Rx RB, and maps the signal to the $2^{nd}$ Tx RB so as to be matched to the confirmed communication-enabled terminal. Thereafter, the communication-enabled Tx terminal transmits to the Rx terminal the mapped signal by using the $2^{nd}$ Tx RB.

Thereafter, the Tx terminal selects a communication mode used to communicate with the Rx terminal according to whether there is detected signal interference (step 705). More specifically, the Tx terminal operates in a Zero Forcing (ZF) or Interference Alignment (IA) mode when the inverse echo signal is received at their tone locations. Otherwise, when the inverse echo signal is not received at their tone locations, the Tn terminal determines whether they cause signal interference to other in-group links. In this case, when causing the interference, the Tx terminal operates in the ZF or IA mode, and when not causing the interference, the Tx terminal operates in a single user MIMO mode.

Figure 8:
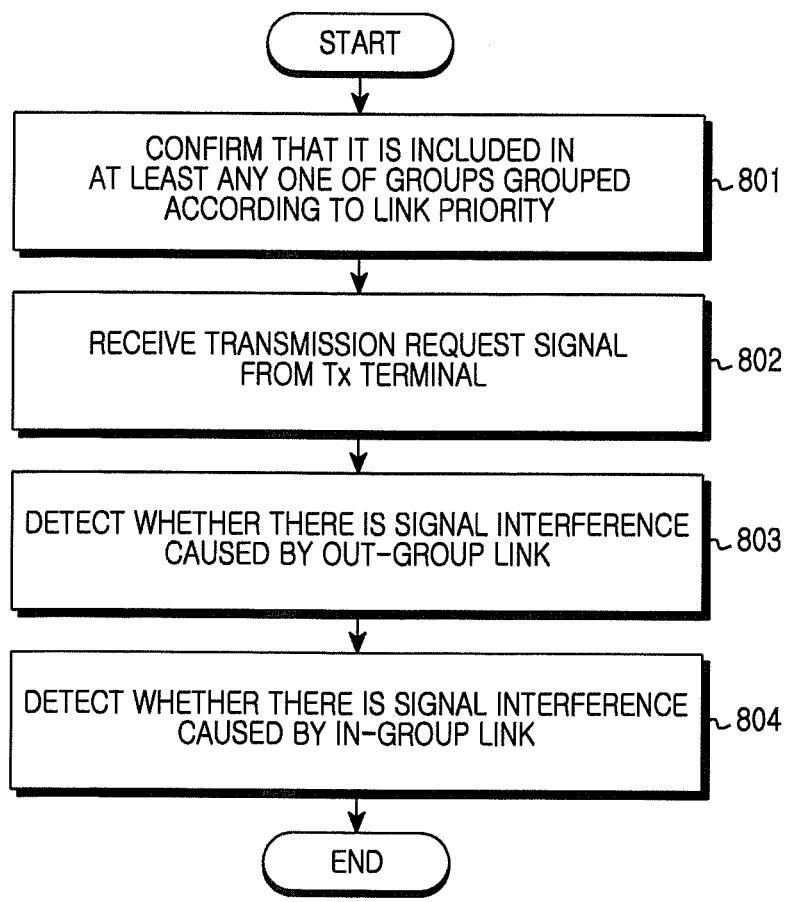
FIG. 8 illustrates a flowchart of a method of operating an Rx terminal, linked to a Tx terminal, for performing D2D communication according to an exemplary embodiment of the present disclosure.

FIG. 8 illustrates a flowchart of a method of operating an Rx terminal, linked to a Tx terminal, for performing D2D communication according to an exemplary embodiment of the present disclosure. As illustrated in FIG. 8, the Rx terminal confirms that the Rx terminal is included in at least any one of groups grouped according to a link priority (step 801). Herein, the grouping can be defined in the present disclosure that at least three links are grouped into at least one group according to a link priority of links constituting a D2D communication network. More specifically, in order for a Tx terminal to transmit the transmission request signal to an Rx terminal, the transmission request signal is mapped to any one of regions of the $1^{st}$ Tx RB, and in this case, the Tx terminal may confirm a location of the transmission request signal mapped to any one of the regions of the $1^{st}$ Tx RB and then confirm a link priority by recognizing a location of a group to which the Tx terminal belongs. The Rx terminal receives the transmission request signal from the Tx terminal, and can know a link priority by confirming a location of the $1^{st}$ Tx RB which receives the transmission request signal from the Tx terminal.

Thereafter, the Rx terminal receives the transmission request signal from the Tx terminal (step 802). The $1^{st}$ Tx RB is used when the Tx terminal receives the transmission request signal from the Rx terminal. More specifically, when the Tx terminal transmits the transmission request signal by mapping the signal to any one of regions of the $1^{st}$ Tx RB, the Rx terminal receives the transmission request signal by using a region of the $1^{st}$ Tx RB matched to a region to which the transmission request signal is mapped. The transmission request signal is used when the Rx terminal performs interference checking on an out-group link to determine whether there is signal interference.

Upon receiving the transmission request signal from the Tx terminal, the Rx terminal determines whether there is a signal interference caused by the out-group link (step 803). The interference checking can be defined as an operation in which an Rx terminal for receiving a transmission request signal determines whether there is a signal interference caused by Tx terminals belonging to a group other than a group to which the Rx terminal belongs. More specifically, the Rx terminal determines whether there is a signal interference caused by Tx terminals of an out-group higher link and Tx terminals of an out-group lower link, excluding Tx terminals in the group to which the Rx terminal belongs. That is, the Rx terminal determines whether there is a signal interference caused by links included in a group having a higher priority than the group to which the Rx terminal belongs, and thereafter if it is determined that there is no signal interference caused by the links included in the higher-priority group, determines again whether there is a signal interference caused by links included in a lower-priority group.

Thereafter, the Rx terminal determines whether there is a signal interference caused by an in-group link (step 804). The checking of a signal interference caused by an in-group link can be defined as an operation in which an Rx terminal for receiving a transmission request signal determines whether there is a signal interference caused by Tx terminals in a group to which the Rx terminal belongs. More specifically, the Rx terminal receives a signal from a communication-enabled Tx terminal, confirms a link capable of performing D2D communication among at least three in-group links, and detects a signal interference caused by a Tx terminal of a link capable of performing D2D communication. That is, if it is determined that the signal interference caused by the Tx terminal is present, the process of detecting the signal interference caused by the Tx terminal of the link capable of performing D2D communication maps an inverse echo signal to the $2^{nd}$ Rx RB matched to a region of the $2^{nd}$ Tx RB used when a communicable signal is received.

Figure 9:
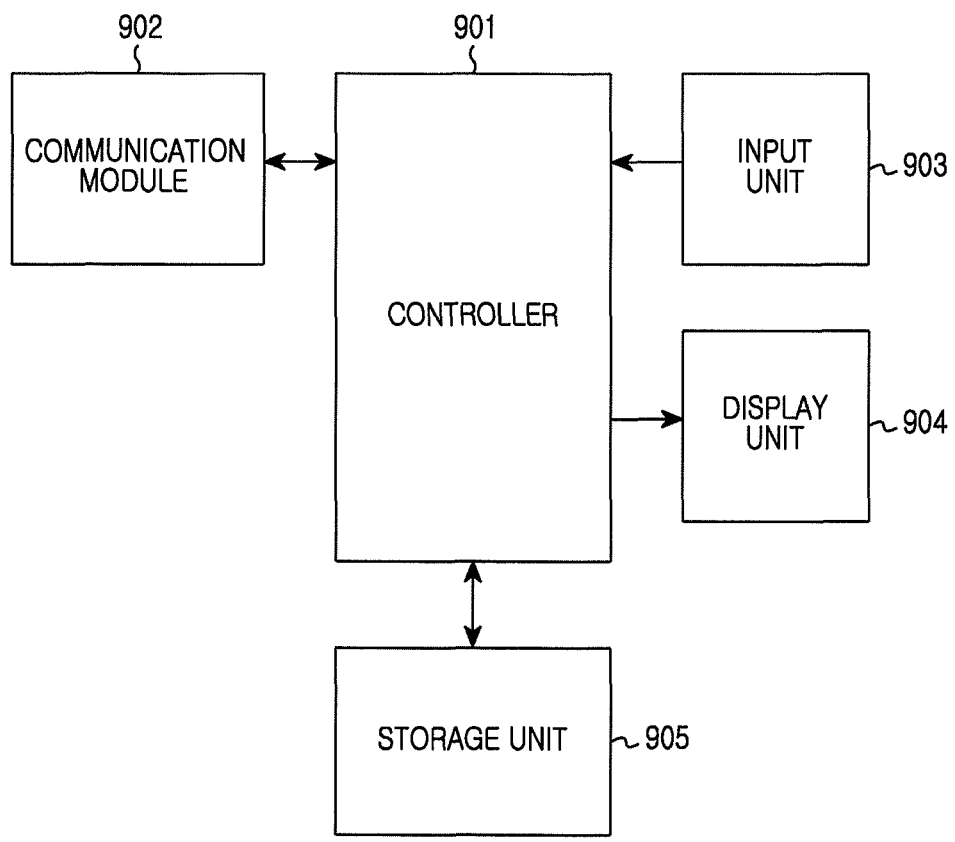
FIG. 9 illustrates a block diagram of a structure of a terminal for performing D2D communication according to an exemplary embodiment of the present disclosure.

FIG. 9 illustrates a RB diagram of a structure of a terminal for performing D2D communication according to an exemplary embodiment of the present disclosure. As illustrated in FIG. 9, the terminal of the present disclosure includes a controller 901, a communication module 902, an input unit 903, a display unit 904, and a storage unit 905.

The controller 901 provides an overall control to the terminal. For example, in case of a Tx terminal of the present disclosure, the controller 901 confirms that a Tx terminal of the present disclosure is included in at least any one of groups grouped according to a link priority, selects a communication mode used to communicate with an Rx terminal according to whether there is a signal interference, and searches for other terminals for performing D2D communication. In addition, the controller 901 confirms that a transmission request signal to be transmitted to the Rx terminal is mapped to any one of regions of a $1^{st}$ Tx RB, and confirms a link priority by confirming a location of the mapped region. Further, the controller 901 confirms a communication-enabled Tx terminal of a region in which no signal is transmitted among regions of the $1^{st}$ Rx RB, maps a signal to the $2^{nd}$ Tx RB so as to be matched to the confirmed communication-enabled terminal, and determines the number of data streams according to whether there is signal interference. In addition, the controller 901 selects any one of communication modes, i.e., a single user MIMO mode, a ZF mode, and an IA mode, according to the number of data streams determined depending on the signal interference.

In case of an Rx terminal of the present disclosure, the controller 901 confirms that the Rx terminal is included in any one of groups grouped according to a link priority, and performs interference checking on an out-group link. In addition, if it is determined that the group of the Rx terminal is a highest-priority group, the controller 901 determines whether there is a signal interference caused by at least three Tx terminals in a group having a second-highest link priority. If it is determined that the signal interference caused by the at least three Tx terminals having the second-highest link priority is present, the controller 901 maps an indicator signal to a $1^{st}$ Rx RB assigned to an Rx terminal having the signal interference. In addition, if it is determined that the group of the Rx terminal is not the highest-priority group, the controller 901 determines whether there is a signal interference caused by at least three Tx terminals in a group having the highest link priority. If it is determined that the signal interference caused by the at least three Tx terminals having the highest link priority is present, the controller 901 maps an indicator signal to the $1^{st}$ Rx RB assigned to the Rx terminal having the signal interference. In addition, if it is determined that the signal interference caused by the at least three Tx terminals having the highest link priority is absent, the controller 901 determines whether there is a signal interference caused by at least three Tx terminals in a group having a second-highest link priority, and if it is determined that the interference caused by the at least three Tx terminals is present in the group having the second-highest link priority, the controller 901 maps the indicator signal to the $1^{st}$ Rx RB so as to be matched to a region of the $1^{st}$ Tx RB used by the Tx terminal which causes the interference. In addition, the controller 901 determines whether the Rx terminal has a signal interference caused by at least three in-group links, confirms a link capable of performing D2D communication among the at least three in-group links by confirming a signal to which a communicable signal is mapped, and detects a signal interference caused by a Tx terminal of the link capable of performing D2D communication. In addition, if it is determined that the Rx terminal has a signal interference caused by the Tx terminal, the controller 901 maps an inverse echo signal to a region of the $2^{nd}$ Rx RB corresponding to an Rx terminal having a signal interference.

For voice and data communication, the communication module 902 processes a signal transmitted and received through an antenna. For example, the communication module 902 of the Tx terminal receives from the Rx terminal a result of determining whether there is a signal interference caused by at least three in-group links. In addition, the communication module 902 of the Tx terminal transmits information including the number of Tx antennas and the number of Rx antennas to each of the found terminals, and receives information including the number of Tx antennas and the number of Rx antennas from each terminal. In addition, the communication module 902 of the Tx terminal transmits a transmission request signal to the Rx terminal, receives a transmission response signal from the Rx terminal by using a $1^{st}$ Rx RB, and transmits a signal mapped to a $2^{nd}$ Tx RB to the Rx terminal.

The communication module 902 of the Rx terminal of the present disclosure performs communication according to a communication mode selected by the Tx terminal, transmits a transmission response signal to the Tx terminal, and receives a signal, to which a communicable signal is mapped, from the Tx terminal by using the $2^{nd}$ Tx RB.

The input unit 903 provides the controller 901 with input data generated by a user's selection.

The display unit 904 displays status information of the portable terminal, a menu screen, and story information under the control of the controller 901. For example, the display unit 904 consists of a touch screen.

The storage unit 905 may include a program storage unit for storing a program for controlling the operation of the terminal and a data storage unit for storing data generated while the program is executed.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method for operating a first terminal establishing a link with a second terminal through a device to device (D2D) communication, the method comprising:

identifying a group comprising the first terminal and the second terminal, among a plurality of groups determined based on a link priority and a number of antennas of each terminal;

transmitting a request signal for determining whether the link is affected by a first interference caused by a link of another group among the plurality of groups or not;

if no response of the request signal is received from the second terminal, determining a number of data streams according to whether the link is affected by a second interference caused by another link of the group; and communicating with the second terminal according to a communication mode determined based on the number of data streams, wherein the response of the request signal is received if the second terminal determines that the link is affected by the first interference.

2. The method of claim 1, wherein each of the plurality of groups is determined by an equation of:

$$\sum_{i=1}^{K} d^{[i]}(M^{[i]} + N^{[i]} - 2d^{[i]}) \geq \sum_{i,j \in K, i \neq j}^{K} d^{[j]} d^{[i]},$$

where K denotes a number of links in a first group, $M^{[i]}$ denotes a number of antennas of an $i^{th}$ transmit (Tx) terminal in the first group, $N^{[i]}$ denotes a number of antennas of an $i^{th}$ receive (Rx) terminal in the first group, and $d^{[i]}$ denotes a number of data streams of the $i^{th}$ Tx terminal in the first group.

3. The method of claim 1, further comprising:

determining that no response of the request signal is received from the second terminal by confirming a second region among regions of a first receive (Rx) resource block (RB) matched a first transmit (Tx) RB, and wherein the request signal is transmitted on a first region in the first Tx RB, and wherein the second region corresponds to the first region.

4. The method of claim 3, further comprising:

receiving, from each terminal, information for indicating the number of antennas of each terminal included in the plurality of groups; and determining a priority of the link by using a location of the first region in the first Tx RB.

5. The method of claim 3, wherein communicating with the second terminal according to the communication mode comprises:

mapping a direct signal corresponding to the first terminal to one of regions of a second Tx RB; and transmitting, to the second terminal, the direct signal.

6. The method of claim 5, wherein communicating with the second terminal according to the communication mode comprises:

determining whether the link is affected by the second interference based on whether an inverse echo signal is received from the second terminal or not; and determine whether the link affects other link of the group by using a second Rx RB, if the first terminal determines that the link is not affected by the second interference, and wherein the second terminal determines whether the link is affected by the second interference and maps the inverse echo signal to one of regions of the second Rx RB matched the second Tx RB if determining that the link is affected by the second interference.

7. The method of claim 6, wherein communicating with the second terminal according to the communication mode comprises:

determining the communication mode as a zero-forcing (ZF) beamforming mode or an interference alignment (IA) beamforming mode if the first terminal determines that the link is affected by the second interference or if the first terminal determines that the link is not affected by the second interference and the link affects other link of the group.

8. The method of claim 6, wherein communicating with the second terminal according to the communication mode comprises:

determining the communication mode as a single user-multiple input multiple output (SU-MIMO) beamforming mode if the first terminal determines that the link is not affected by the second interference and the link does not affect other link of the group.

9. An apparatus of a first terminal establishing a link with a second terminal through a device to device (D2D) communication, comprising:

at least one transceiver; and at least one processor operatively coupled to the at least one transceiver;

wherein the at least one processor is configured to:

identify a group comprising the first terminal and the second terminal, among a plurality of groups determined based on a link priority and a number of antennas of each terminal;

transmit a request signal for determining whether the link is affected by a first interference caused by a link of another group among the plurality of groups or not;

if no response of the request signal is received from the second terminal, determine a number of data streams according to whether the link is affected by a second interference caused by another link of the group; and communicate with the second terminal according to a communication mode determined based on based on the number of data streams, wherein the response of the request signal is received if the second terminal determines that the link is affected by the first interference.

10. The apparatus of claim 9, wherein each of the plurality of groups is determined by a equation of:

$$\sum_{i=1}^{K} d^{[i]}(M^{[i]} + N^{[i]} - 2d^{[i]}) \geq \sum_{i,j \in K, i \neq j}^{K} d^{[j]} d^{[i]},$$

where K denotes a number of links in a first group, $M^{[i]}$ denotes a number of antennas of an $i^{th}$ transmit (Tx) terminal in the first group, $N^{[i]}$ denotes a number of antennas of an $i^{th}$ receive (Rx) terminal in the first group, and $d^{[i]}$ denotes a number of data streams of the $i^{th}$ Tx terminal in the first group.

11. The apparatus of claim 9, wherein the at least one processor is configured to:

determine whether the link is affected by the second interference based on whether an inverse echo signal is received from the second terminal or not; and determine whether the link affects other link of the group by using a second Rx RB, if the first terminal determines that the link is not affected by the second interference, and wherein the second terminal determines whether the link is affected by the second interference and maps the inverse echo signal to one of regions of the second Rx RB matched a second Tx RB if determining that the link is affected by the second interference.

12. The apparatus of claim 11, wherein the at least one processor is configured to determine the communication mode as a zero-forcing (ZF) beamforming mode or an interference alignment (IA) beamforming mode if the first terminal determines that the link is affected by the second interference or if the first terminal determines that the link is not affected by the second interference and the link affects other link of the group.

13. The apparatus of claim 11, wherein the at least one processor is configured to determine the communication mode as a single user-multiple input multiple output (SU-MIMO) beamforming mode if the first terminal determines that the link is not affected by the second interference and the link does not affect other link of the group.

14. The apparatus of claim 9, wherein the at least one processor is further configured to determine that no response of the request signal is received from the second terminal by confirming a second region among regions of a first receive (Rx) resource block (RB) matched a first transmit (Tx) RB, wherein the request signal is transmitted on a first region in the first Tx RB, and wherein the second region corresponds to the first region.

15. The apparatus of claim 14, wherein the at least one processor is further configured to:

receive, from each terminal, information for indicating a number of antennas of each terminal included in the plurality of groups; and determine a priority of the link by using a location of the first region in the first Tx RB.

16. The apparatus of claim 14, wherein the at least one processor is further configured to:

map a direct signal corresponding to the first terminal to one of regions a second Tx RB; and transmit, to the second terminal, the direct signal.

17. The apparatus of claim 16, wherein the at least one processor is configured to:

determine whether the link is affected by the second interference based on whether an inverse echo signal is received from the second terminal or not; and determine whether the link affects other link of the group by using a second Rx RB, if the first terminal determines that the link is not affected by the second interference, and wherein the second terminal determines whether the link is affected by the second interference and maps the inverse echo signal to one of regions of the second Rx RB matched the second Tx RB if determining that the link is affected by the second interference.

* * * * *